United States Patent
Malle et al.

(10) Patent No.: US 9,729,484 B2
(45) Date of Patent: Aug. 8, 2017

(54) METHOD OF PROCESSING CONNECTION DATA OF PLATFORM OF AN INTERNET SITE

(71) Applicant: NETWAVE, Labege (FR)

(72) Inventors: Jean-Pierre Malle, Saint Michael sur Orge (FR); Henri Marty, Montrabe (FR)

(73) Assignee: NETWAVE, Labege (FR)

( * ) Notice: Subject to any disclaimer, the term of this patent is extended or adjusted under 35 U.S.C. 154(b) by 108 days.

(21) Appl. No.: 14/418,428

(22) PCT Filed: Aug. 1, 2013

(86) PCT No.: PCT/EP2013/066215
§ 371 (c)(1),
(2) Date: Jan. 29, 2015

(87) PCT Pub. No.: WO2014/020120
PCT Pub. Date: Feb. 6, 2014

(65) Prior Publication Data
US 2015/0304260 A1    Oct. 22, 2015

(30) Foreign Application Priority Data
Aug. 1, 2012   (FR) ..................... 12 57488

(51) Int. Cl.
*G06F 15/16* (2006.01)
*H04L 12/58* (2006.01)
(Continued)

(52) U.S. Cl.
CPC .......... *H04L 51/14* (2013.01); *G06F 17/3089* (2013.01); *G06Q 30/06* (2013.01); *H04L 51/16* (2013.01); *H04L 67/306* (2013.01)

(58) Field of Classification Search
USPC ....... 709/224, 203, 206, 217, 219, 223, 226, 709/228, 231, 232, 238; 705/67; 726/26
See application file for complete search history.

(56) References Cited

U.S. PATENT DOCUMENTS

2010/0162406 A1* 6/2010 Benameur .............. G06Q 10/06
726/26
2011/0029665 A1* 2/2011 Wenig ..................... H04L 67/22
709/224

(Continued)

FOREIGN PATENT DOCUMENTS

FR  2 809 565 A1  11/2001
FR  2 962 823 A1   1/2012

*Primary Examiner* — Quang N Nguyen
(74) *Attorney, Agent, or Firm* — Blakely Sokoloff Taylor & Zafman LLP

(57) ABSTRACT

The present invention relates to a method of processing data regarding connection to a platform (2) of an internet site by a server (1) comprising at least one data processing unit and data storage means, the method being characterized in that it comprises steps of: (a) identification of a situation of a user connected to said platform (2) via an item of equipment (3) from among a list of reference situations, each reference situation being associated with at least one strategy, each strategy comprising one or more situational engines chosen from among a library of situational engines, each situational engine being able to implement a given processing on a situation of a user so as to obtain a message having a hoped-for effect on the situation; (b) for at least one of the strategies associated with said identified situation, implementation by the data processing means of the server (1) of the situational engines of said strategy on said situation so as to obtain at least one stack of messages; (c) dispatching to the item of equipment (3) of said user and/or of the platform (2) of a subset of messages of said at least one stack of messages.

10 Claims, 6 Drawing Sheets

(51) Int. Cl.
*G06F 17/30* (2006.01)
*G06Q 30/06* (2012.01)
*H04L 29/08* (2006.01)

(56) References Cited

U.S. PATENT DOCUMENTS

2014/0279554 A1* 9/2014 Priebatsch ........... G06Q 20/322
 705/67
2014/0279556 A1* 9/2014 Priebatsch ........... G06Q 20/322
 705/67

* cited by examiner

METHOD OF PROCESSING CONNECTION DATA OF PLATFORM OF AN INTERNET SITE

GENERAL TECHNICAL FIELD

The present invention relates to the field of analysis of data used for e-commerce.

More precisely it relates to a system for processing connection data to a platform of an Internet site, the method being dedicated especially to statistical processing, to datamining, to the design of decision-making tools, to diagnostics, to provision or approximation, to design of simulators, automatic learning or learning aid systems and in general to the design of analysis systems of situations or situational analysis.

PRIOR ART

Development of the Internet has caused a rise in online commerce, or "e-commerce". Many services including product sales, users linking, the bank or the press are proposed on networks.

In its wake e-commerce has brought the emergence of "e-business", that is, everything that can be executed upstream to set up a transaction and then ensure client loyalty, in particular electronic marketing.

In fact, even though online selling theoretically enables personalising in the extreme of client relations, the prevalent anonymity on the Internet prevents application of traditional marketing rules, based on targeting and differentiation of clients.

Understanding the Internet user is accordingly essential. Some e-commerce participants propose that their client fills out profiles to better identify them, so as to offer them a personalised approach, just as a shop seller would do. But this solution is restrictive for the Internet user who is also often reticent to give out personal information.

Known techniques propose collecting "behavioural data" on the Internet user, for example via the content of his history, to better identify him and personalise the content he receives, advertising in particular. These techniques however lend only partial understanding of the Internet user, and derive minimal information only.

The present invention proposes an alternative system for processing data connection for determining, through a new architecture, situations of users connected to the platform of an Internet site, and then analyse them to obtain data and predict other situations, without depending on a model or a physical or logical implementation structure.

PRESENTATION OF THE INVENTION

The present invention proposes a method for processing connection data to a platform of an Internet site by a server comprising at least one data-processing unit and data-storage means, the method being characterised in that it comprises steps of:

(a) Identification of a situation of a user connected to said platform via an equipment among a list of reference situations, each reference situation being associated with at least one strategy, each strategy comprising one or more situational motors selected from a library of situational motors, each situational motor being capable of executing given processing on a situation of a user so as to obtain a message having an expected effect on the situation;

(b) For at least one of the strategies associated with said identified situation, execution by the data-processing means of the server of the situational motors of said strategy on said situation so as to obtain at least one stack of messages;

(c) Sending to the equipment of said user and/or of the platform a subset of the messages of said at least one stack of messages.

According to other advantageous and non-limiting characteristics of the invention:

each strategy is associated with a level of essentiality, the order of execution of the motors associated with the strategies depending on the levels of essentiality of said strategies;

at least two stacks of messages are obtained at step (b), each stack being associated with a level of confidentiality;

each strategy is further associated with a list of texts and/or URL links and/or images, the messages produced by the motors of said strategy being built from texts and/or URL links and/or images of said list of the strategy;

at least one stack of message is a stack "Last in, first out" (LIFO) of fixed size, the oldest messages being replaced by the most recent messages;

at least one stack of message is a stack of "token" type, the platform sending out a token to the stack when a message is requested, the messages receiving a token being replaced by the most recent messages;

pages of said Internet site comprise at least one exposure area capable of receiving a message in a given format and having given parameters, a message of a stack having parameters and a format compatible with said area being extracted from the stack and sent to the platform when the exposure area is free;

the situation of a user is identified in step (a) by comparison of a situational signature of the user with a plurality of masks, each mask being associated with one of the reference situations and corresponding to a space of situational signatures, the situational signature of a user being obtained by observing a set of observable indices relative to personal data of said user connected to the platform and/or relative to general data;

some of the spaces of situational signatures corresponding to the different masks are modified as a function of some messages sent during step (c).

According to a second aspect, the invention relates to a server comprising at least one data-processing unit and data-storage means, said at least one processing unit being configured to execute the method according to the first aspect of the invention during connection of a user to a platform of an Internet site via equipment, the server being in connection with said platform.

BRIEF DESCRIPTION OF FIGURES

Other characteristics and advantages of the present invention will emerge from the following description of a preferred embodiment. This description will be given in reference to the appended drawings, in which.

DETAILED DESCRIPTION OF A PREFERRED EMBODIMENT

Situations

As compared to all known processes, the data-processing method according to the invention is based as mentioned previously on analysis of complete "situations", and not on a simple list of parameters.

Throughout the present description, application of the method to the previously mentioned field of e-commerce (in this case said data are connection data to a platform of an Internet site, i.e. data regarding the connection to the platform) will be described more particularly, though it is clear that it can be transposed to processing of user data in general on a workstation. The data can in fact be emails of the user, his system parameters, etc. Processing connection data gives excellent results in terms of situation identification due to volume and diversity of such data.

Here "situation" of a user means information which is more or less complex and more or less fuzzy describing the psychological, sociological state of the user and his situational scene (all situations of other connected users). A situation can be called by a term meaningful for the e-merchant, for example "afternoon forager" to designate women who surf the Internet after lunch without preconceived ideas.

Situational analysis opens up wide perspectives into many economic fields by using tools for analysis, prediction and simulation. Situational analysis (see for example French patent application FR2962823) are capable autonomously of receiving at input one or more situational flows, extracting situations from it, distinguishing the important elements and applying processing continuously, detecting phenomena and providing solution evolutions, especially by induction.

The advantages are many: as will be seen, situational systems are not restricted by models or implementation architectures and therefore adapt permanently. Just like the human brain, they are capable of concentrating on the essentials by managing their resources. Finally, their possibilities appear far more universal than those of any current expert system, partitioned in a particular field.

The principle of the data-processing method (processing being carried out by a server comprising at least one data-processing unit and data-storage means, the server being, in the case of the processing connection data to a platform of an Internet site, in a network connection with said platform) according to the invention is to identify by a first mechanism the situation of one or more users, then to process by a second mechanism the situations collected thereafter. In the case of e-commerce, relevant users are users connected to said platform via equipment, or even all visitor Internet users if the resources of the server permit (see below).

This processing can have several recipients and many purposes, as will also be explained later.

Figure 1:
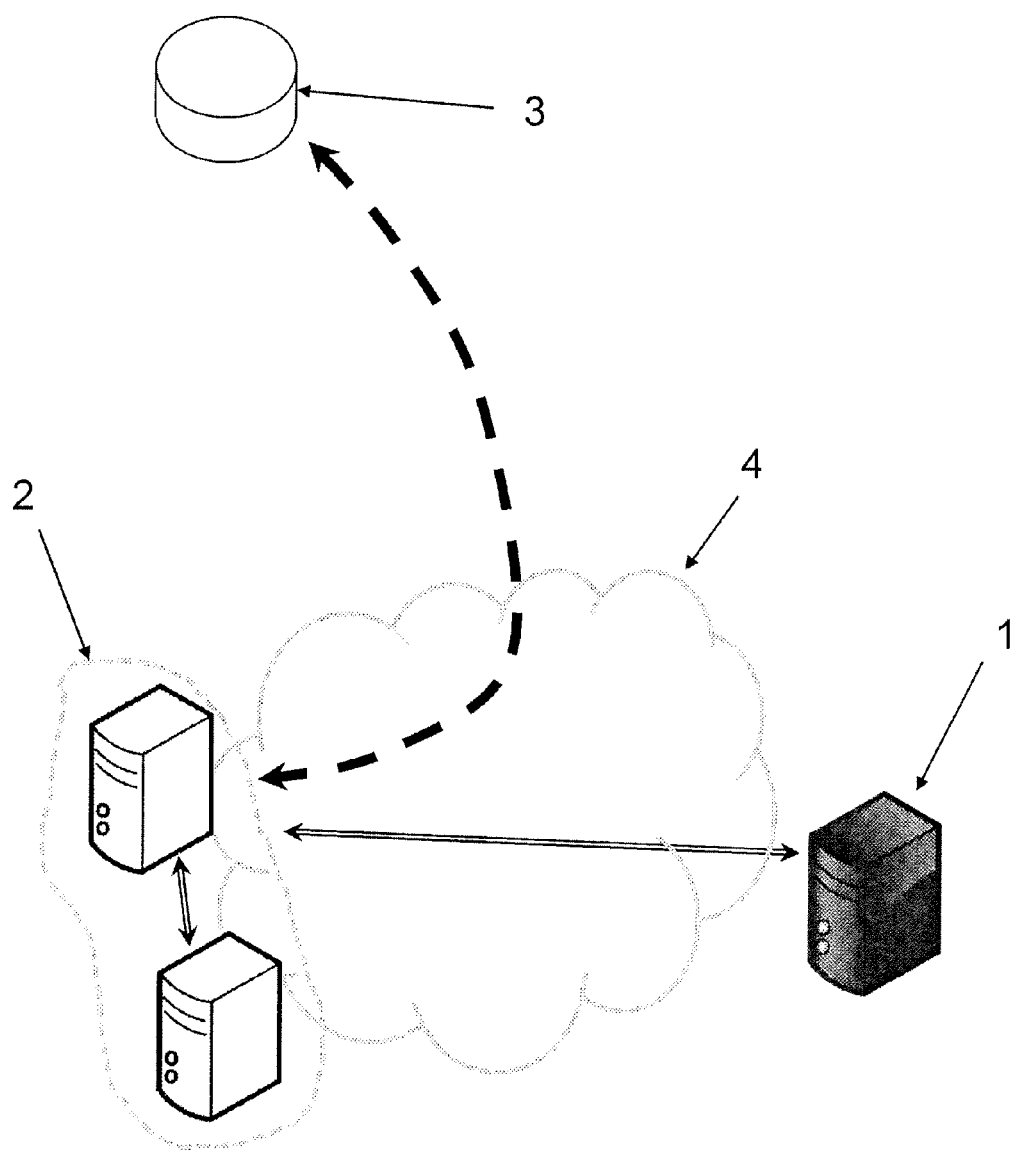
FIG. 1 is a diagram of network architecture wherein the invention fits into.

FIG. 1 shows the network architecture wherein the invention is carried out. An equipment 3 (this can be any sort of computer equipment via which a user can access the Internet, from a workstation to a mobile terminal such as a smartphone or a touch tablet) is connected to the platform 2 of an Internet site via the Internet network 4. The server 1 comprising at least one data-processing unit and data-storage means for running the method is in network connection with said platform 2.

It is important to understand that the term "platform" designates one or more interconnected servers of the Internet site hosting the page(s) of the Internet site, which the user is currently searching. The server 1 conducting the processing can be one of these servers making up the platform 2. The equipment user 3 in all cases is connected directly or indirectly (via the platform 2) across the Internet network to the server 1 which is executing the method. It should be noted that the connection between the processing server 1 and the platform 2 can be local, but alternatively nothing prohibits it from passing through the Internet network 4.

First Mechanism: Identification of a Situation

Figure 2:
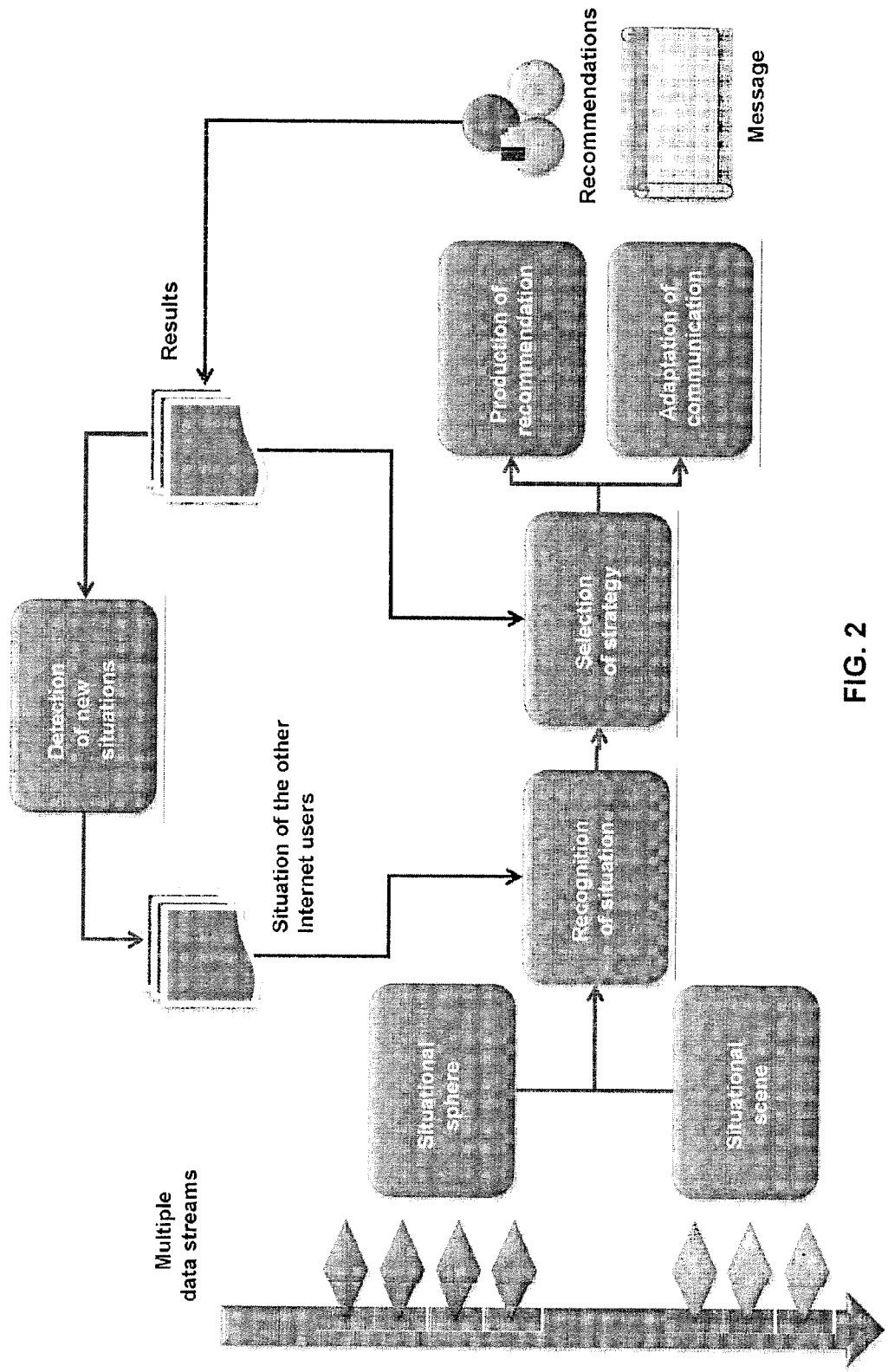
FIG. 2 is a diagram schematically showing the steps of the method for processing connection data according to the invention.

As is shown by FIG. 2, identification of the situation of a user connected to said platform is done from a list of reference situations which can be either predefined from observation of behaviour of Internet users, or particularly advantageously automatically generated by another mechanism to be described later.

For this to happen, the situation identification mechanism of the method according to the invention utilises "triggers". Triggers are software modules capable of being activated and initiating particular processing as a function of predefined events.

The triggers can be of many types. In a first type, the event is an action of the Internet user such as a consultation click, a selection click, etc. In a second type the event is the expiration of a deadline, for example after the final visit of the Internet user, or relative to the preceding activation of the trigger (in this latter case it is activated at a fixed frequency, for example every hour). It is clear that many other configurations are possible.

On activation of a given trigger, the data-processing means of the server 1 trigger an attempt for determination of the state of at least one "index". Indices are various elements significant for a situation. Some indices relate to the "situational scene", that is, the set or a subset of the situations of connected Internet users, which occur concurrently. This can be for example time, weather forecast, etc. Alternatively, some indices relate to the "situational sphere", that is, the particular situation of the Internet user. This is for example age, genre, height of the Internet user, his navigation (rapid, hesitant, etc.) his state (in a hurry, seeking, etc.). The indices are therefore relative to personal data of said user connected to the platform 2 and/or relative to general data. The combination of these two situational "areas" in practice offers good results for reliable determination of the situation of a user.

Naturally, some indices relative to preferred results (for example the conclusion or not of a transaction) are especially involved, in particular in light of analysis of situations.

The processing unit(s) of the server 1 have a predetermined collection of observable indices. It should be noted that observable does not mean necessarily determinable. An attempt to determinate the status of an index can be unfruitful. For example, the age of the Internet user is not always accessible. The index is then considered to be "indiscernible". It is not however impossible for a later attempt (via the same trigger or another one) to be successful this time.

A list of the indices to try to determine is associated with each trigger. If this trigger is activated, it will be these indices and only these indices whereof the status will be observed. By way of example, a periodic trigger could try to determine the weather forecast or the number of clicks per second of the user. Alternatively, a trigger linked to the click on the "send" button at the end of a form could try to determine the age and genre of the user as a function of the input text.

As a function of the results of said attempt to determine the status of at least one index, the processing unit(s) generate and store on the storage means of the server 1 a situational signature of the user (if a situational situation exists already, it is only updated).

The situational signature of a user corresponds to all the data relative to the indices, which characterise the situation of the user.

Advantageously, a situational signature comprises in particular a plurality of information units, each being associated with an index (advantageously there are two parts in a situational signature, the units being called respectively "thresholds" if the associated index relates to the situational scene, and "trackers" if the associated index relates to the situational sphere), each information unit able to take on at least three values including a first value if the determined status of the associated index corresponds to a reference status (value "1"), a second value if the determined status of the associated index does not correspond to the reference status (value "0"), and a third value (value "X") if the status of the associated index could not be determined (whether because no attempt at determination was made for the associated index, or because the attempt following setting of the trigger failed). Each information unit is a "bit" with three values.

It is evident that notations 0, 1 and X are purely illustrative and that the skilled person could select the data representation of his choice. In particular, it is feasible to use information units having no determined number of values and capable of storing numbers for example, character chains, etc. It will however be explained later the interest of having information units with n status. Using the notation defined previously, 1X10 01XX is an example of a situational signature with 8 information units.

It is also noted that even though the case of "no attempted determination"/"determination attempted but unsuccessful" (same value "X") is not distinguished here, the information according to which determination was attempted can alternatively be taken into account. In fact, although the information constituting the status of the index could not be obtained, the fact that the attempt failed can be significant. For example this can mean that the user has voluntarily (or even involuntarily) concealed parts of his profile and therefore that it can be someone trying to increase his Internet confidentiality.

It should be noted that some trackers or thresholds can be based on integrators of distribution law, for example Gauss or Poisson, to confer on the latter a long-lasting character. In other terms, the integrators "provide" the status which the index must have as a function of preceding observations, in the short term avoiding the need to retrigger an attempt at determination when the preceding one occurred a short time ago.

The situational signature of the user is compared to a plurality of "masks". Each mask is associated with a reference situation, and corresponds to a space of situational signatures. For this, each mask comprises as a signature a plurality of information units which can take on the values 0, 1, X, but also a fourth value (noted "A") if the information unit can be any one. The status of some indices is not in fact characteristic of some situations.

For example 10A0 AAX1 is a mask with 8 information units which combines the following signatures: 1000 00X1, 1000 01X1, 1000 0XX1, 1000 10X1, 1000 11X1, 1000 1XX1, 1000 X0X1, 1000 X1X1, 1000 XXX1, 1010 00X1, 1010 01X1, 1000 0XX1, 1010 10X1, 1010 11X1, 1010 1XX1, 1010 X0X1, 1010 X1X1, 1010 XXX1, 10X0 00X1, 10X0 01X1, 10X0 0XX1, 10X0 10X1, 10X0 11X1, 10X0 1XX1, 10X0 X0X1, 10X0 X1X1, 10X0 XXX1.

Comparison between the signature and a mask is done easily by way of logic gates (each unit of the mask having no value "A" is compared to the corresponding unit on the signature by XOR, and AND is applied to the results of these comparisons). When a mask corresponds, the situation of said user connected to the platform 2 is identified as being the reference situation associated with the at least one mask containing said situational signature.

It should be noted that a plurality of masks is advantageously stored on the storage means of the server 1, and that it is not impossible for some of the masks to have ranges which overlap, in other words there is no uniqueness of the mask corresponding to a given situation. To resolve this difficulty, masks are advantageously tested iteratively according to rotation: if the test is positive, the reference situation associated with the mask is kept, and if not the following mask is tested. When a new trigger is activated, the same situation mask is retested first to maintain the stability of the current, situation if possible.

On completion of this first phase of the method, there is therefore a situation identified as being the situation of the user.

Second Mechanism: Processing of the Situation

The second mechanism of the method according to the invention consists of analysis of the identified situation of the user by physical or logical situational analysis means of the server 1 so as to obtain processed data which will be significant for the user, a manager of the Internet site, etc. The situational analysis means can consist of an application executed by the data-processing means of the server 1 (this can be a multi-core processor whereof cores are dedicated to this situational analysis, as below).

For this, each reference situation is associated with at least one "strategy" (advantageously 1 to 3), that is, a set comprising one or more situational motors (and any parameters of these motors) and content of messages, that is, texts, graphic content (including images, videos, etc.), URL links (Uniform Resource Locator), form elements (format, font parameters, etc.), and any other data useful for personalising a message. Message (also called recommendation) means any form of communication resulting from processing connection data and having an expected effect on the situation.

In conventional terms, these can be report messages addressed to the manager of the site (in the form of emails, for example), but can especially be messages intended for the user whose situation is being processed. For example, this can be a banner which displays in the Internet page being consulted, an email, an SMS, etc.

The situational motor(s) are software elements selected from a library of situational motors. Each situational motor is capable of executing given processing on a situation of a user (the motor takes into account parameters of the whole scene and the situational sphere: in fact, if the situational signature of a user is unique, the identified situation is not. Taking into account information units, that is, status of the indices observed, personalises processing) so as to obtain one or more messages having an expected effect on the situation.

A first example of a motor can employ a recommendation of one or more products connected to those visited (oriented to shop situations). A second example of a motor can employ a recommendation of products bought by Internet users in a situation similar to the identified situation of the user (at the personal level). In a third example of a motor, trendy products (detection of a significant rise in sales, at the level of the group sociology) can simply be recommended.

It should be noted that the same strategy can be associated with several situations and that each strategy can deal with a level "of essentiality", that is, a priority criterion which can be important in case of major user affluence.

For at least one of the strategies associated with said identified situation (can be analysed by order of essentiality), the processing means of the server 1 run the associated situational motors to obtain at least one stack of message. Advantageously, at least two stacks of messages (advantageously three) are created, each being associated with a level of confidentiality. Level of confidentiality means the level of publicity of the message. For example, in executing the method with two levels of confidentiality, level 1 corresponds to personal messages, while level 2 corresponds to global messages (for example a banner on the site). The three examples of motors described previously correspond to three distinct levels of confidentiality: the first presents a "low" level of confidentiality, since it is intended for any user; The second presents a "high" level of confidentiality, since the recommendation is personal, and therefore is intended for the user only. The third corresponds to an "average" level of confidentiality, since exposure occurs at the level of the group. The three recommendations produced by these three motors will therefore be found in three different stacks.

These stacks of messages are then unstacked to "expose" the messages, that is, send them to their recipient. More precisely, this consists of sending (as appropriate) to the equipment 3 of said user and/or to the platform 2 (when page elements) a subset of the messages of said at least one stack of message.

This can be done via a simple policy of LIFO (Last In First Out), but advantageously a so-called token strategy is used. In this strategy, the current page comprises exposure areas capable of receiving a message in a given format and having given parameters. The areas, when available, send a token comprising the different parameters of the area. A situational motor receives the token and constitutes "on command" one or more messages as a function of these parameters. The messages with the token are extracted from the stack before the others.

The exposure of the message(s) affects the situation (for example by causing a transaction if it has had the expected impact on the user), which has chances of activating new triggers and causing a change in the situation where the user is. The method is relaunched and the effect of the messages will be observes in the next analysis cycle.

Optimisation of Processing Capacities

The activity of Internet users is not constant throughout the day, and in particular at peak periods the data-processing means of the server 1 can encounter difficulties in facing the influx of information (in other terms the volume of the flow to be processed).

Advantageously, the system considers these traffic variabilities and regulates the method. In particular, the method advantageously mobilises the resources necessary to identify the situations of all connected users (the first part of the method consumes fewer resources than the second), but analyses only part as per available capacities, in particular sorted according to the "essentiality level" of strategies as mentioned previously.

For this, three gradual levels of activity are defined (here called "alphafloor", "betafloor" and "gammafloor"), with operation shifting to degraded mode (some situations beyond a threshold are dropped) or deferred (some situations which are deemed interesting are not treated straight away due to congestion, but will be treated later when activity is lower). Specifying the analysis of a situation can also vary as a function of the level of activity: if the resources are unsufficient, the essential is dealt with ("essentially deductive" mode), and if not a precise analysis is undertaken ("essentially inductive" mode) for which there is more reflex. In the case of a semi- or non-supervised modes (see below), in case of available resources learning is favoured.

The three above levels are defined as a function of the typical levels of activity on the site in number of actions per second.

The alphafloor corresponds to a "high" level of activity. For example this is a site having up to 1000 simultaneous connections, supposing that a user produces a click (or any other action such as input) every 10 seconds on average, the alphafloor is at 100 Hz.

The betafloor corresponds to an "average" level of activity. For example if on the same site there are 100 000 connections per day and it is seen that an Internet user stays for 1 min 30 seconds on average, the betafloor is at 10.4 Hz.

The gammafloor corresponds to a "low" level of activity. For example, if the site has a ratio of 1 to 100 between maximum and minimum simultaneous connections on a day (or a minimum of 10 simultaneous connections at 9 seconds per click), the gammafloor is at 1.11 Hz.

In the opposite case (more processing capacities available than necessary), the method can utilise "Shadows", that is, maintain existing situations of former users to increase the learning base.

Semi-Supervised and Non-Supervised Modes

The method requires a set of reference situations to function, but this set is not fixed and can evolve. In particular, strategies can include situational motors configured so that messages are sent to point out in particular to a manager of the site the emergence of a new situation. The manager can decide to make a new reference situation of it.

In a semi-supervised mode, the system suggests new reference situations to the manager (associated with a mask predetermined by the situational motor), and the latter can validate these propositions or not. Alternatively, in a non-supervised mode (such as that shown by FIG. 2), the system is completely automatic and includes the new reference situations.

It should be noted that the appearance of new situations by "budding" is observed. In other words, what the motors detect is the emergence of a sub-category of a bigger situation (for example if a significant number of the situational signatures corresponding to a reference situation presents identical statuses for indices classified as "A", that is, not accounted for in the mask). Alternatively, for a given reference situation, on the attempt can be made to select those situations which have ended in a transaction to detect the effective messages.

Reflex Processors

According to a second aspect, the invention relates to a system 1, in particular a server 1 comprising at least one data-processing unit and data-storage means, said at least one processing unit being configured to execute the method according to the first aspect during connection of a user to a platform 2 of a site via equipment 3.

As explained, most frequently the method is carried out by a server of the site which is distinct from the servers comprising the platform 2 (that is, the servers hosting the pages of the site and manage the operation of the site), the equipment 3 of the user being connected to said server to execute the method via the platform 2.

Figure 3:
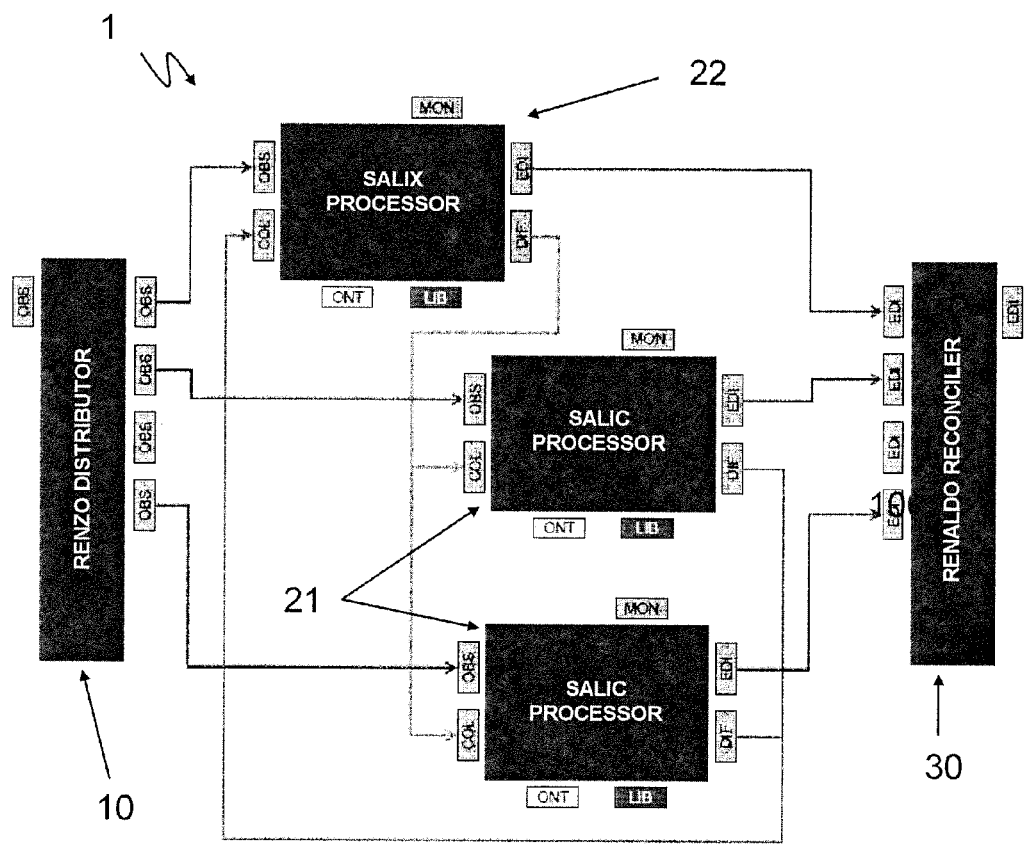
FIG. 3 is a diagram of an embodiment of a system for processing connection data according to the invention.

As is particularly preferred, the second aspect of the invention relates to a system 1 for processing connection data to a platform 2 of an Internet site whereof a particularly preferred embodiment is shown in FIG. 3. This system comprises

- at least two independent connection data-processing modules 21, 22 (modules "SALI2" whereof SALIX and SALIC are two versions), the processing modules 21, 22 being distributed into at least two complementary groups, the modules 21, 22 of a group being configured to run a subset of the operations necessary for execution of a method of processing connection data of a user to said platform 2 comprising identification of a situation of the user, the processing modules 21 of each group receiving data coming from the processing modules 22 of another group so as to complete all data-processing connection processes;
- a distributor module 10 ("RENZO") which receives said connection data and sends it to the processing modules 21, 22;
- a reconciler module 30 ("RENALDO") which collects data coming from the processing modules 21, 22 and delivers to said platform 2 treated connection data.

These modules 10, 21, 22, 30 are called reflex processors due to their aptitude to process "without a priori" the entry data.

The principle is therefore to have two (or even more) groups of n modules 21, 22, the modules 21, 22 of one group performing the same task in parallel, and the tasks of each of the groups being complementary to perform processing of connection data. The different modules 21, 22 can be either physically independent processors (and connected by a bus), each having its processing means and its storage space, or alternatively software bricks used on given equipment, the modules sharing the same processor resources (optionally multi-core) and the same storage space. It should be noted that the system 1 can be distributed over several servers or even be installed in cloud-computing on virtual machines. The modules 21, 22 advantageously exchange data in the form of flow in an abstraction language, for example XML (eXtensible Markup Language), JSON (JavaScript Object Notation), SOAP (Simple Object Access Protocol), Silvia or even Mawerick protocol.

Figure 4:
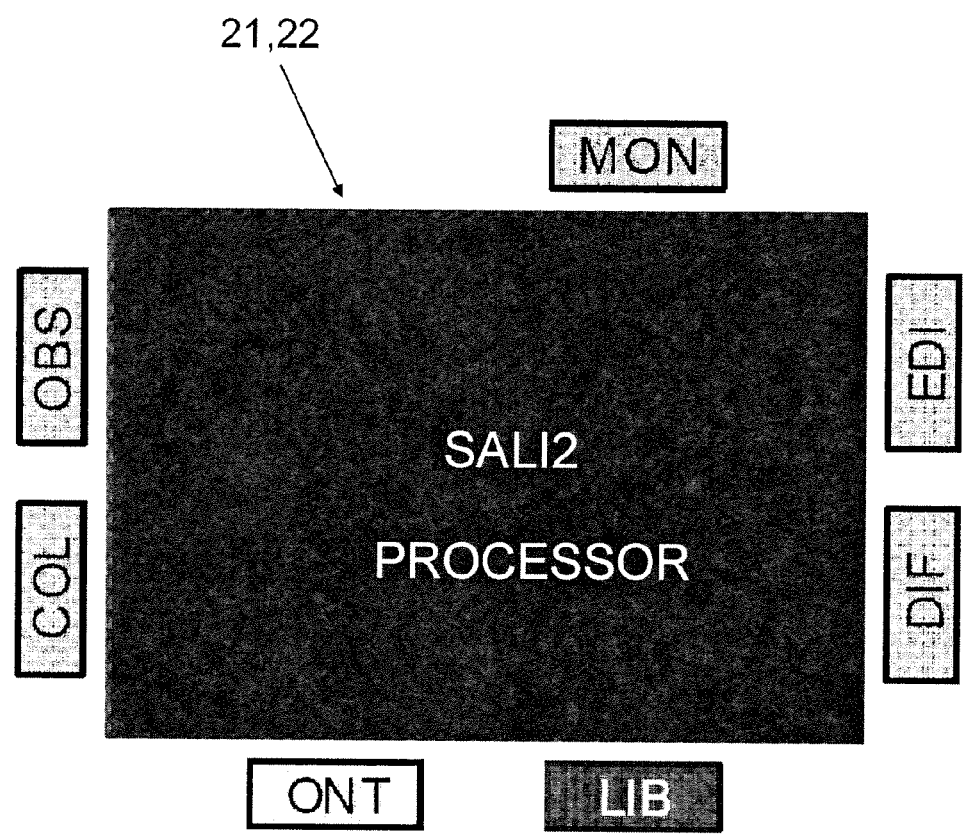
FIG. 4 shows a processing module of a system for processing connection data according to the invention.

In reference to FIG. 4 this schematically shows a processing module 21, 22 (independent of the group) of SALI2 type. As is evident, it advantageously has 7 entry/output ports. It is in fact preferable for the modules 21, 22 to be connected to a library of executable situational motors and/or a database containing an ontology characteristic of said internet site so it can conduct the method steps explained previously.

In particular:

- The OBS port (observer) receives the data originating from the platform 2 in the form of XML flow;
- The COL port (collector) receives data coming from the other processing modules 21, 22 SALI2 in the form of XML flow;
- The ONT port (ontology) receives the ontology in the form of an XML file;
- The LIB port (library) contains the libraries of trackers, thresholds and situational motors (executable);
- The EDI port (editor) sends output data in the form of XML flow;
- The DIF port (diffuser) sends data to processing modules 21, 22 of other groups in the form of XML flow;
- The MON port (monitoring) sends statistics.

The distribution of tasks between the groups of modules 21, 22 allows greater processing efficiency by the specialisation of modules 21, 22, and the fact that each group is fed with data ensures "feedback", as is clear from FIG. 3. The results of part of the processing improve the other part of processing. Several keys of possible distributions between the groups of processing modules 21, 22 will be described later. It should be noted that it is possible to combine these approaches: the system 1 can have two groups of modules 21, 22 distributed according to a first law, the modules 21, 22 of a group being distributed into two sub-groups according to a second law.

The sorting work is done by the distributor module 10 which interprets each packet of information, and addresses it to the adequate processing modules 21, 22.

The reconciler module 30 receives the flow relative to messages to be sent as a function of processing completed and deals with the publication of these messages. It recomposes an overall flow to the platform 2 of the site and/or the equipment 3 of the user.

According to a first variant, the processing modules 21 of a group are pre-processing modules configured to identify the situations of users connected to said platform 2, and the processing modules 22 of another group are post-processing modules configured to treat identified situations of connected users. In this particularly advantageous configuration, there is advantageously a pre-processing module 21, and N post-processing modules 22 (in particular 4 or 8, but it is understood that this is not limited to this number and that there can be any number), as the processing of resulting situations and sending of messages is the greatest consumer part of resources of the method.

The feedback link, seen in FIG. 2, allows the pre-processing modules 21 to collect data coming from the post-processing module or post-processing modules 22 so as to influence the identification of situations. This makes possible the non-supervised mode mentioned previously.

According to a second variant, the processing modules 21 of a group execute real-time operations (modules of "immediate processing"), and the modules 22 of another group execute deferred operations (modules of "deferred processing"). In other words, some modules 21 execute tasks needing immediate action (for example the triggers connected to the navigation of users, sending messages with immediate exposure), whereas the other modules 22 perform tasks whereof the execution can be offset over time. The data are stored in storage means until they can be processed. This configuration facilitates the durability of information and consideration of the past to the extent where at any instant the "real-time" modules 21 receive data relative to deferred processings (therefore the fruit of older connection data). The feedback loop lets the deferred processing modules 22 communicate with the immediate processing modules 21 of the "processing grids" via which immediate processing is adapted. This configuration adapts also very well to periods of strong affluence in transferring data from immediate processing to deferred processing.

This concerns the system shown in FIG. 3: the "SALIX" is the deferred processing module 22, and the "SALIC" are the immediate processing modules 21. In this particularly advantageous configuration, there is advantageously a deferred processing module 22, and N immediate processing modules 21 (immediate processing has priority, and is a greater consumer since some of the processings cannot be deferred). In a configuration with 4 immediate processing modules 21, there is a total of 7 modules 10, 21, 22, 30, an octo-core processor is therefore particularly preferred (the eighth core managing the rest of the system operations).

Figure 5:
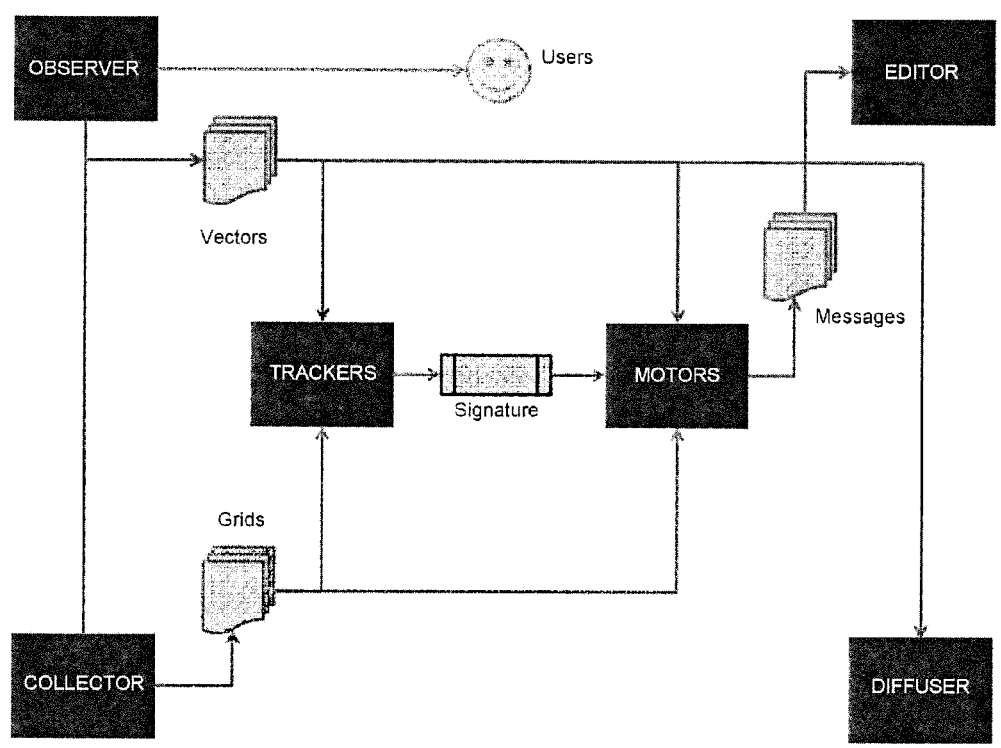
FIG. 5 is a diagram of an immediate processing module of an embodiment of a system for processing connection data according to the invention.
Figure 6:
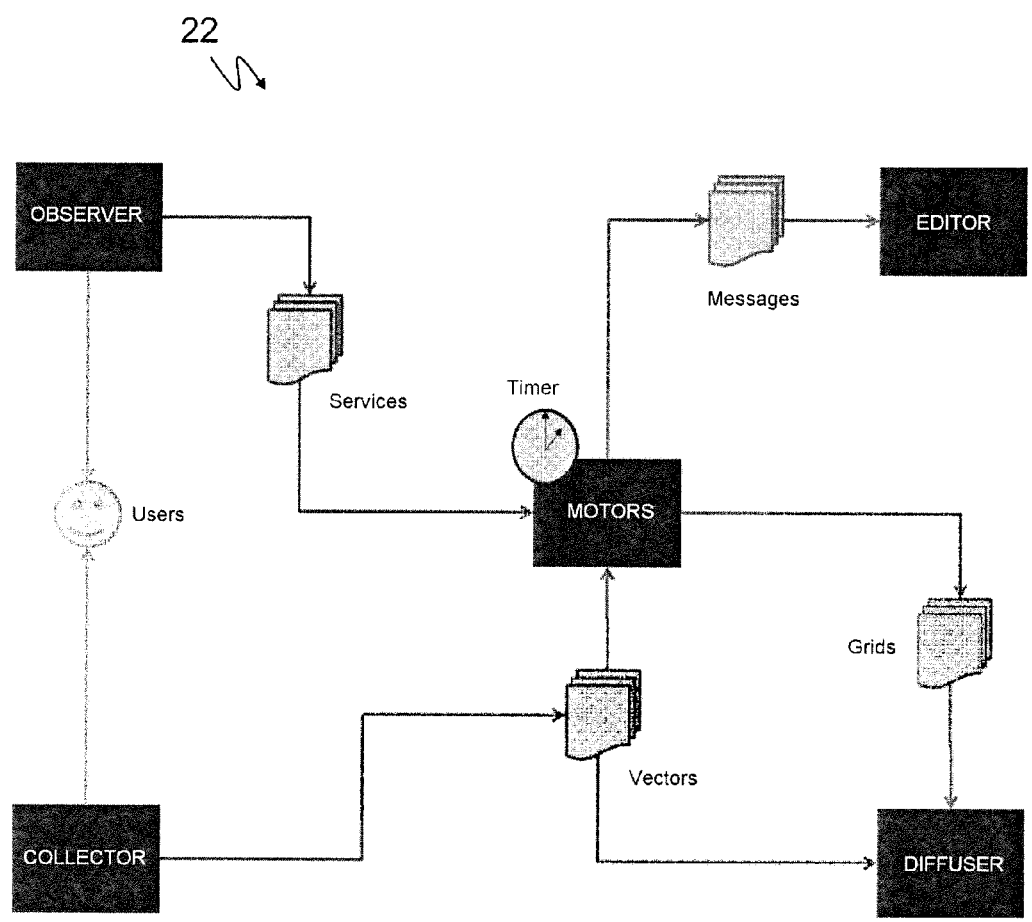
FIG. 6 is a diagram of a processing deferred module of an embodiment of a system for processing connection data according to the invention.

FIGS. 5 and 6 represent in more detail respectively an immediate processing module 21 of SALIC type and a deferred processing module 22 of SALIX type. These figures show ports OBS, COLL, EDI and DIF (ports ONT, LIB and MON are cabled similarly between the two types of module).

An immediate processing module 21 SALIC deals with identifying all user situations (to be done in immediate time) via the consultation, selection and consumption vectors (comprising the data observed for determining the statuses of the indices) received by the observer port.

The diffuser port transmits the vectors to the deferred processing module 22 SALIX. The collector port receives the information vectors processed as deferred and the grids coming from the deferred processing module 22 SALIX.

The trackers (and thresholds) generate the situational signatures from vectors and grids. The real-time situational motors associated with the strategies of identified situations are executed, and the messages produced by the execution of motors sent via the editor port.

A deferred processing module 22 SALIX deals with processings which have no need to be done straight away. The observer port receives exclusively data relative to services and administrative users. The collector port receives the vectors coming from the immediate processing modules 21 SALIC. Situational motors are run and controlled by a timer (timer) which defines at which point the processing is deferred.

These motors produce the deferred messages (messages going to users being sent a few hours following a visit for example in the form of a promotional email encouraging them to return to the site) and messages for the administrators of the site sent to adequate supports via the editor port, as well as processing grids which are sent back (with some vectors) to the immediate processing modules 21 SALIC via the diffuser port, as explained.

According to a third variant, each group of modules 21, 22 corresponds to a "line of services". This is a product classification base unit within an Internet site inside the system called "LSO" for Lines/Services/Options. A line of services combines several services. For example the category "Salon" combining "Tables", "TV Furniture", "Couches", etc. services in a furniture catalogue is a line of services. Similarly, the category "Man", or "Size XL" is a line of services of a clothing catalogue. On an Internet site such as a merchant site, it is possible to present the same products under several classification modes, where these are different service lines. Each service has options. In the previous example, a "Pants" service of a line "Man" will contain a list of options which are equally models of pants. Each option presents a product with several variants (size, colours, etc.); each product is in fact unique (given catalogue reference), contrary to the option. The same product can therefore be presented in several LSO contexts. Referring again to this example, the same pants can be found in the service "men Pants" of the "XL" line.

It is feasible to separate the processing modules 21, 22 by line of services, in particular for sites having a wide range of products for which the situations of users will be very different. It should be noted that it is appropriate for large sites that the user is redirected to one or the other of the servers of the platform 2 according to the line of services on which he is navigating.

Also and advantageously several of these variants are combined. In particular, the immediate processing modules 21 SALIC of the second variant can each be dedicated to one or more lines of services. In this case, the distributor module 10 RENZO distributes the incoming flow by directing it to the deferred processing module 22 SALIX if these are administration data or to an immediate processing module 21 SALIC if these are navigation data from a user, as a function of the line of services in which it is located.

The invention claimed is:

1. A method of processing data for connection to a platform (2) of an Internet site by a server (1) comprising at least one data-processing unit and data-storage means, the method being characterised in that it comprises steps of:
    (a) Identifying a situation of a user connected to said platform (2) via equipment (3) from a list of reference situations, each reference situation being associated with at least one strategy, each strategy comprising one or more situational motors selected from a library of situational motors, each situational motor being capable of executing given processing on a situation of a user so as to obtain a message having an expected effect on the situation;
    (b) For at least one of the strategies associated with said identified situation, executing by the data-processing means of the server (1) the situational motors of said strategy on said situation so as to obtain at least one stack of messages;
    (c) Sending to the equipment (3) of said user and/or of the platform (2) a subset of the messages of said at least one stack of messages.

2. The method according to claim 1, wherein each strategy is associated with a level of essentiality, the order of execution of the situational motors associated with the strategies depending on the levels of essentiality of said strategies.

3. The method according to claim 1, wherein at least two stacks of messages are obtained at step (b), each stack being associated with a level of confidentiality.

4. The method according to claim 1, wherein each strategy is further associated with a list of texts and/or URL links and/or images, the messages produced by the motors of said strategy being built from texts and/or URL links and/or images of said list of the strategy.

5. The method according to claim 1, wherein at least one stack of message is a "Last in, first out" (LIFO) stack of fixed size, the oldest messages being replaced by the most recent messages.

6. The method according to claim 1, wherein at least one stack of message is a stack of "token" type, the platform (2) sending out a token to the stack when a message is requested, the messages receiving a token being replaced by the most recent messages.

7. The method according to claim 5 or claim 6, wherein pages of said Internet site comprise at least one exposure area capable of receiving a message in a given format and having given parameters, a message of a stack having parameters and a format compatible with said area being extracted from the stack and sent to the platform (2) when the exposure area is free.

8. The method according to claim 1, wherein the situation of a user is identified in step (a) by comparison of a situational signature of the user with a plurality of masks, each mask being associated with the one of the reference situations and corresponding to a space of situational signatures, the situational signature of a user being obtained by observing a set of observable indices relative to personal data of said user connected to the platform (2) and/or relative to general data.

9. The method according to claim 8, wherein some of the spaces of situational signatures corresponding to the different masks are modified as a function of some messages sent during step (c).

10. A server (1) comprising at least one data-processing unit and data-storage means, said at least one data-processing unit being configured to execute the method according to claim 1 during connection of a user to a platform (2) of an Internet site via equipment (3), the server (1) being in connection with said platform (2).

* * * * *